(No Model.) 5 Sheets—Sheet 1.
M. F. KOCH.
AUTOMATIC WEIGHING SCALE.

No. 314,854. Patented Mar. 31, 1885.

(No Model.) 5 Sheets—Sheet 3.
M. F. KOCH.
AUTOMATIC WEIGHING SCALE.

No. 314,854. Patented Mar. 31, 1885.

(No Model.) 5 Sheets—Sheet 4.

M. F. KOCH.
AUTOMATIC WEIGHING SCALE.

No. 314,854. Patented Mar. 31, 1885.

Witnesses:
John C. Trowbridge
August Schlarbaum

Inventor:
Moris F. Koch
by his attorneys
Briesen & Steele

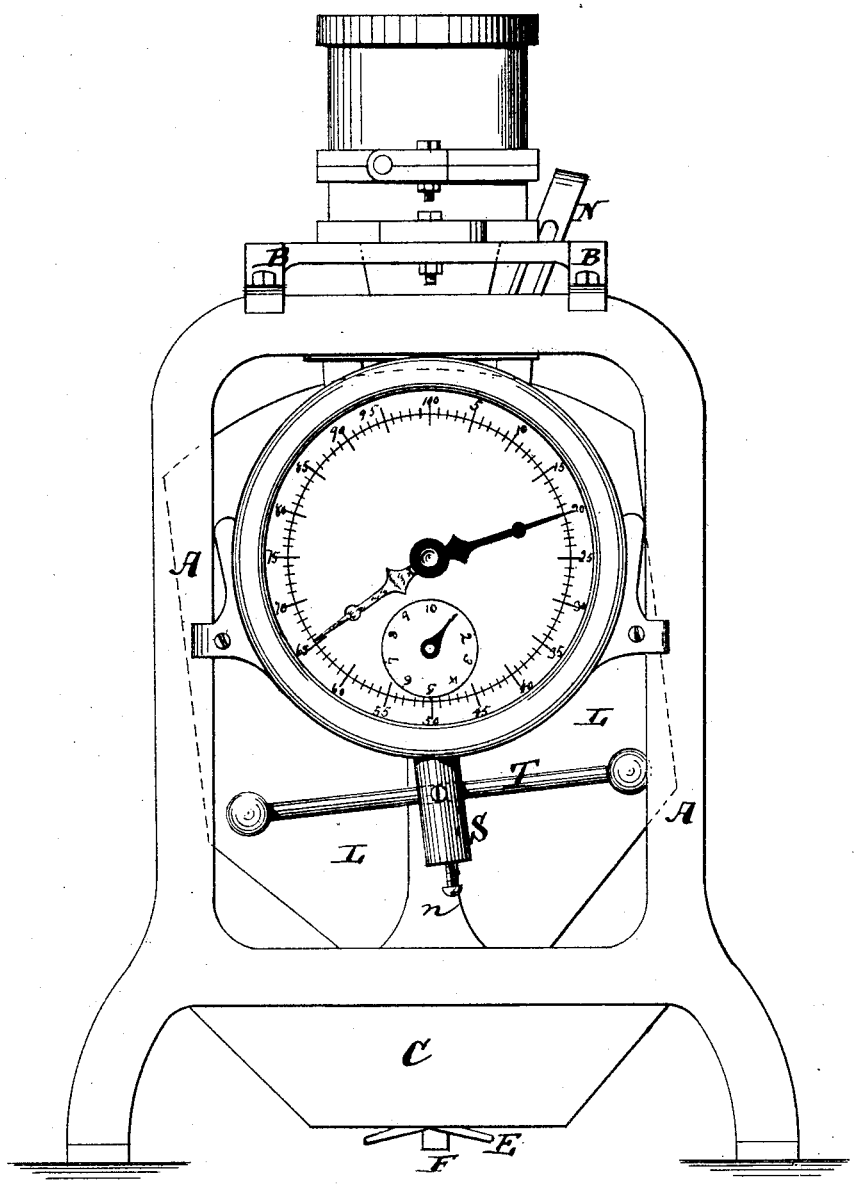

UNITED STATES PATENT OFFICE.

MORIS F. KOCH, OF NEW YORK, N. Y.

AUTOMATIC WEIGHING-SCALE.

SPECIFICATION forming part of Letters Patent No. 314,854, dated March 31, 1885.

Application filed September 24, 1884. (No model.)

*To all whom it may concern:*

Be it known that I, MORIS F. KOCH, a resident of New York city, in the county and State of New York, have invented an Improved Automatic Weighing-Scale, of which the following is a full, clear, and exact description, reference being made to the accompanying drawings, in which—

Figure 1:
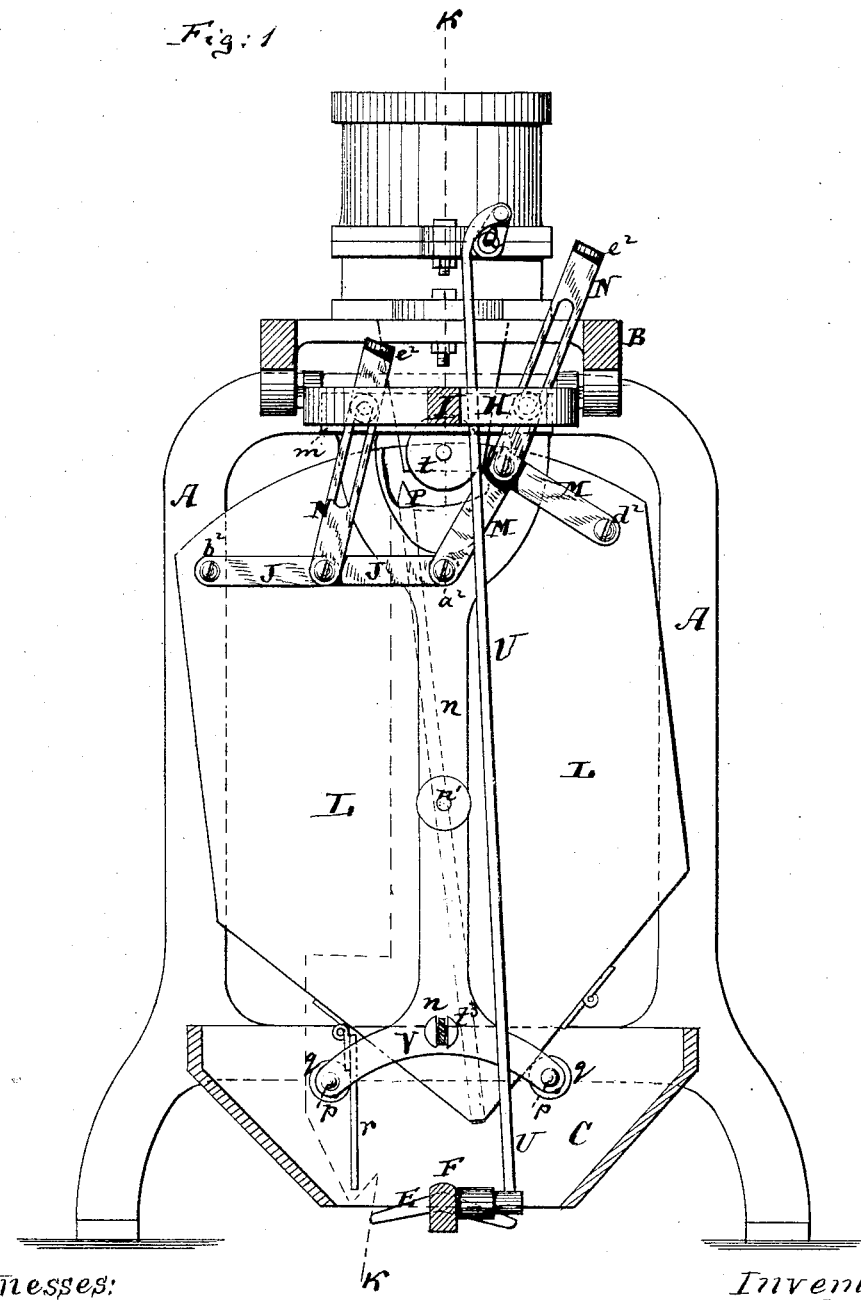
Figure 2:
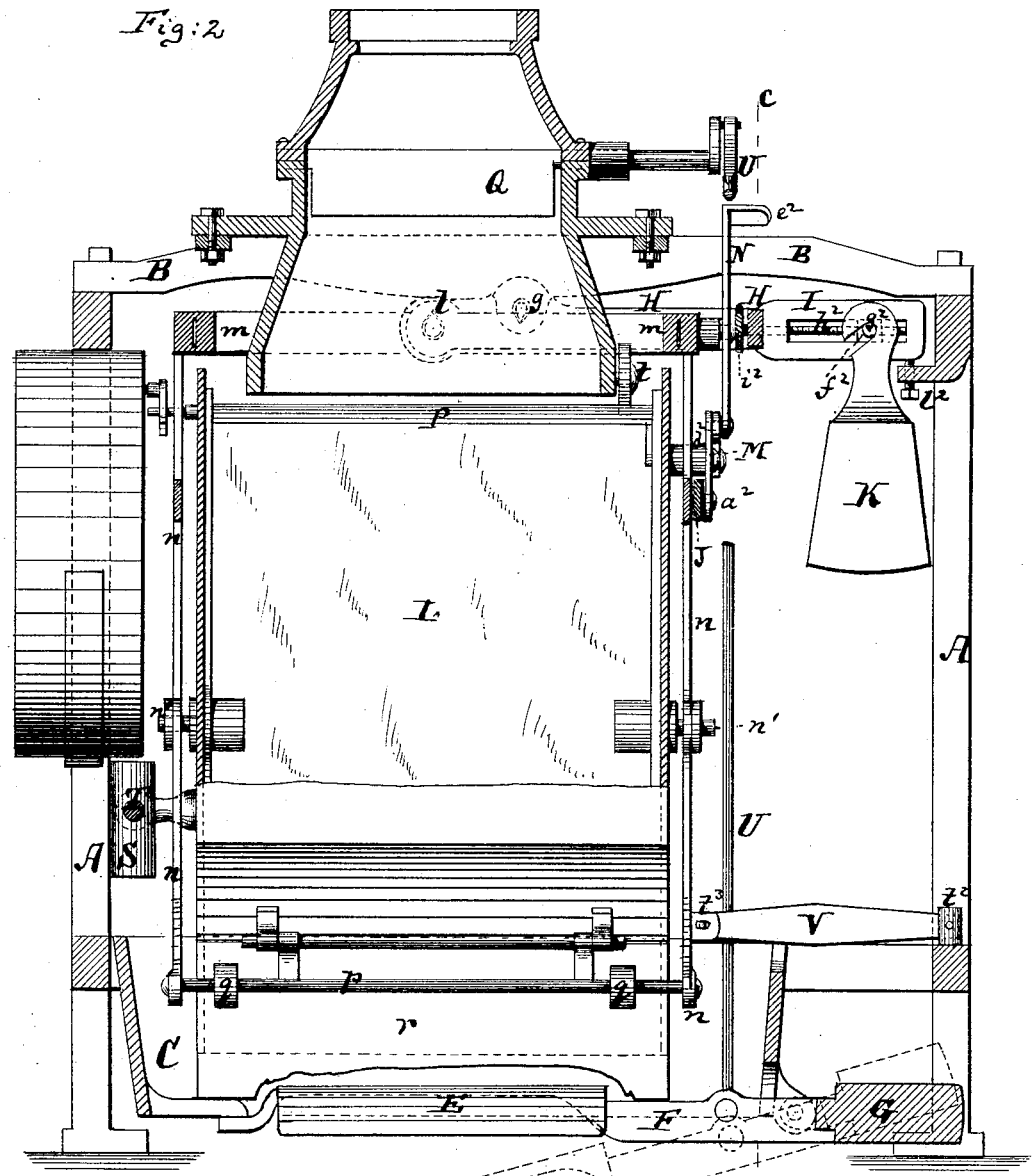
Figure 3:
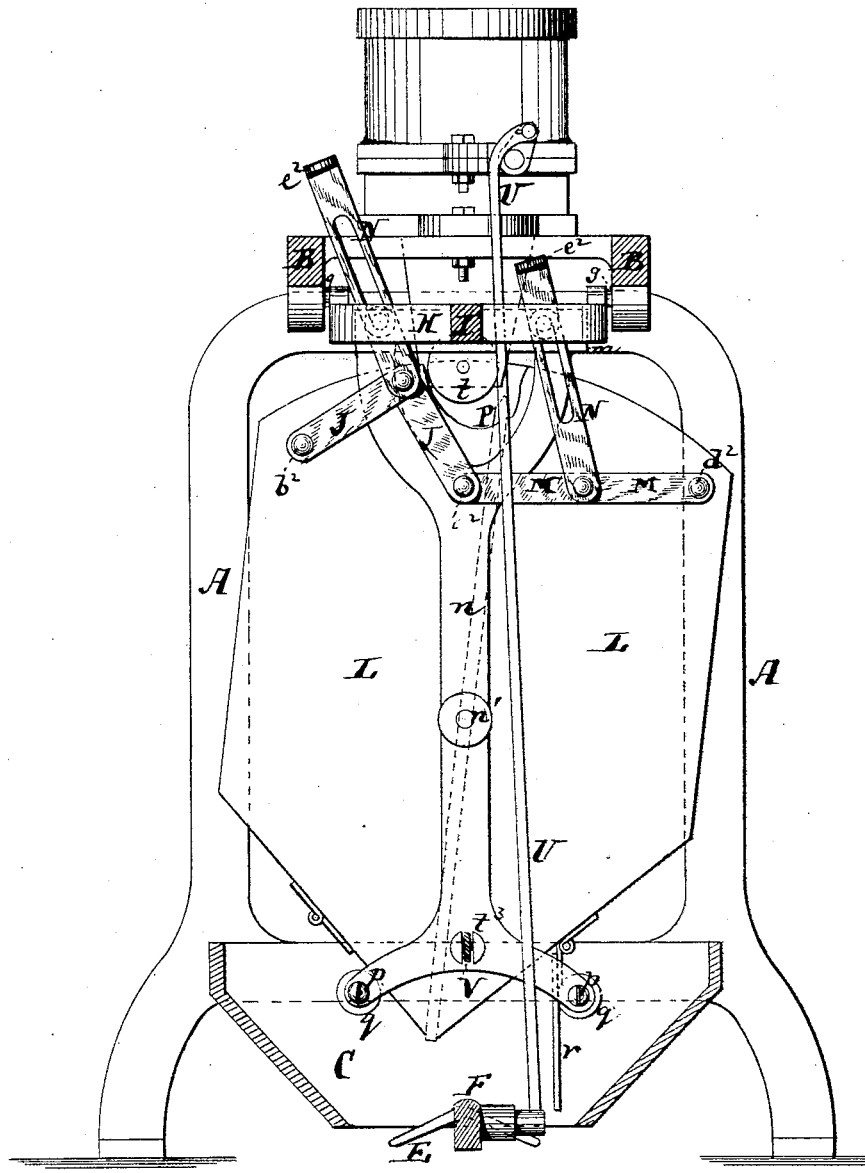
Figure 4:
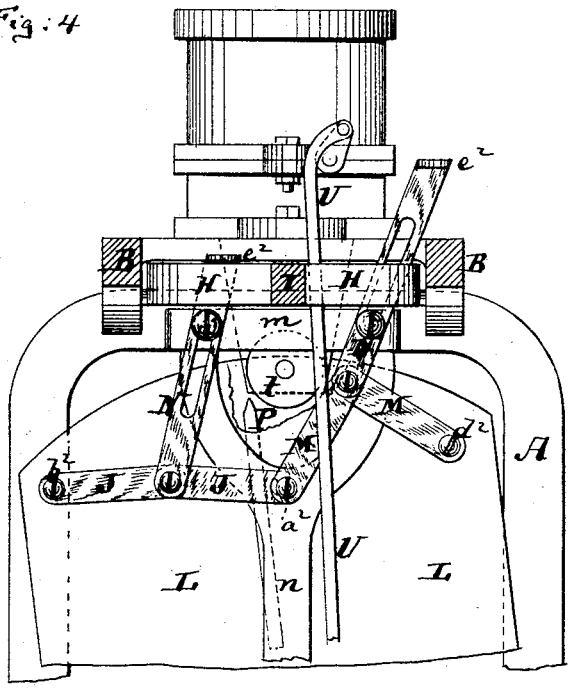
Figure 5:
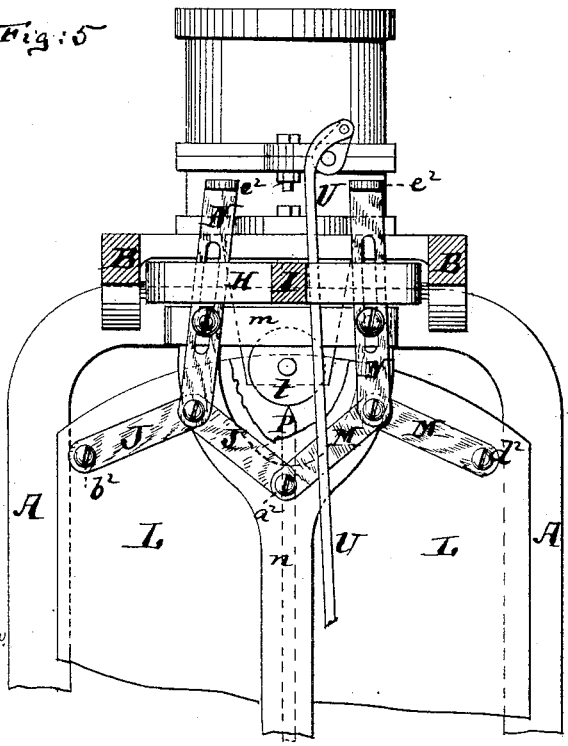

Figure 1 is a side elevation, partly in section, of my improved automatic scale, the line $c\ c$, Fig. 2, indicating the plane of section. Fig. 2 is a vertical central section of said scale, the line $k\ k$, Fig. 1, indicating the plane of section. Fig. 3 is a view similar to Fig. 1, but showing the grain-box tilted in the opposite direction. Figs. 4 and 5 are similar views of the upper portion of the machine, showing the parts in still different positions. Fig. 6 is an end elevation of the scale, showing the opposite end to that shown in Fig. 1.

This invention relates to improvements in automatic scales; and it consists, principally, in a new contrivance for locking the oscillating weighing-box. This locking mechanism is composed of a set of toggle-levers which are adapted to be contracted and extended by connections with the scale-beam and other parts of the mechanism, as hereinafter more fully described.

The invention also consists in combining the oscillating weighing-box of the scale with an adjustable weight placed at one end thereof, said weight serving to balance the above-mentioned locking mechanism, and likewise to equalize any possible difference in weight between the two halves of the box.

The invention also consists in combining the principal weight of the scale, which is suspended from the scale-beam thereof, with a nut and screw by which it can be adjusted, said nut having gudgeons from which said weight is suspended, as hereinafter described.

The invention also consists in other details of improvement that are hereinafter more fully specified.

A is the stationary frame of the scale; C, the hopper at its lower part; F, the lever in the lower part of the hopper, said lever having the ridge-plate E and the counter-weight G. The lever F connects by rod U with the crank-shaft of the gate Q, which is hung in the upper part of the apparatus.

H is the forked scale-beam, which is pivoted at $g$ in the top frame, B, of the scale.

I is the arm of the scale-beam, which carries the weight K.

L is the oscillating weighing-box, which is hung by pivots $n'$ in uprights $n$, whose upper ends are attached to the frame $m$, which is pivoted to the ends of the scale-beam H at $l$. The lower parts of the upright bars $n$ are forked to receive the connecting ties or rods $p$, that carry the rollers $q$, for working the gates $r$.

As far as described the machine is substantially the same as that referred to in Patent No. 306,759, of October 21, 1884.

To one of the uprights $n$ are pivoted at $a^2$ two pairs of toggle levers, J and M—that is to say, the inner ends of these pairs of levers are pivoted to the upright $n$, their outer ends being pivoted at $b^2$ and $d^2$, respectively, to the weighing-box L. Each pair of toggle-levers has a link, N, jointed to it, as shown in Figs. 1 and 3, which link may be slotted and guided on pins that project from the frame $m$, every such link having also a projection, $e^2$, at its upper end, which, when the link is in the lowermost position, as shown on the left-hand side of Fig. 4, will come in contact with the top of the scale-beam H. The weighing-box L has in its center a partition, P, the upper beveled or rounded end of which bears against a roller, $t$, the same as described in my above-mentioned application.

The operation of this link mechanism is as follows: Whenever the weighing-box L is tilted to one side, the toggle-levers on that side will be extended, those on the other side contracted. Thus in Fig. 1 the box is shown tilted to the left, the levers J being extended and the levers M contracted, while in Fig. 3, where the box is represented as tilted to the right, the levers M are extended and the levers J contracted.

Starting from the position shown in Fig. 1, we will assume that the side of the box having the levers M is being filled. When filled to the proper extent, so that the weight K will be overbalanced, the weighing-box will descend, and the scale-beam H will at the same time swing up until the parts are in the position shown in Fig. 4, when the scale-beam will strike the projection $e^2$ of the link N that connects with the levers J. The box continuing to descend, the link N of the levers J will now draw these levers into the contracted position, thus allowing the box L to gradually swing over to the other side.

Fig. 5 represents the box in the central position as it is swinging from one side to the other, the partition P being on the roller $t$, which prevents the maintenance of a dead-center. The box, continuing to swing over toward the right, draws the levers M finally into the distended position, and assumes itself the position which is shown in Fig. 3. In this position, by means of the distended toggles, the weighing-box is locked, and all inexactness of weighing which would follow from the swaying motion of the weighing-box after the proper point of rest has been attained is thereby avoided. So, again, from the position shown in Fig. 3, when the compartment on the left is properly filled the box will descend until the levers M are sufficiently contracted to allow it also to swing sidewise, will reach the position shown in Fig. 5, and finally that shown in Fig. 1, when it will again be locked by the distended levers J. It is quite evident that the links N are not essential to this toggle mechanism, because the same result could be attained by having proper stops on the box L, or on any other part of the mechanism, for starting the toggles in their contracting motion; nor is it essential that the toggle-levers should be connected to the upright $n$. They may be connected to any other part of the framing of the machine, the principal feature of this phase of my invention being that in either inclined position the weighing-box is locked by an extended pair of toggle-levers, the other pair of toggle-levers being at the same time contracted.

The mechanism which has just been described—that is to say, the toggle mechanism—is shown applied to one end of the weighing-box. The other end of the weighing-box, in order to balance the extra weight which is occasioned by the addition of these toggles, carries a weight, S, which is adjustable on a rail or bar, T, that is placed transversely across the end of the weighing-box and joined thereto, as appears from Figs. 2 and 6. By having the weight S laterally adjustable on the rail or bar T, I am enabled, also, to balance the box itself in a lateral direction—that is to say, should, in manufacturing, one side be made a little heavier than the other, the weight S is adjusted to equalize the two sides, and thus said weight serves not only to counterbalance the toggles, but also to equalize the weight of the box laterally. The weight K, which is suspended from the arm I of the scale-beam H, is connected to said arm in the following manner: The arm I is slotted along its length, as shown in Fig. 2, and in this slot is placed a nut, $f^2$, which has projecting gudgeons $g^2$, from which the weight K is suspended by its bifurcated shank. The nut $f^2$ rides on a screw, $h^2$, which has a T-head or suitable handle, $i^2$, at the end where it projects from the arm I. By turning this screw $h^2$, the nut $f^2$ is moved inward or outward at pleasure, and with it the weight K, thereby giving said weight less or greater leverage, and regulating its effect upon the weighing-box.

V is a link which connects one of the uprights $n$ pivotally with the frame A of the machine, as shown in Fig. 2, said link serving to prevent the weighing-box and all the parts that move with it from swaying sidewise—that is to say, in a direction at right angles to that in which the weighing-box is intended to swing. I have found by experiments that the weighing-box is liable to such sidewise vibration, which is wholly objectionable, interferes with the correct weighing of the grain, and, whenever it occurs, causes the grain to settle more near one end than the other of the weighing-box. To obviate this the link V is found to answer the best purpose. It is pivoted at $t^2$ to the frame of the machine and at $t^3$ to the upright $n$, and one of the pivots may be passed through a slot either in the link V or in one of the lugs which support such pivot. There may be more than one such link on one side of the machine, or there may be two, one on each side; but I find that one single link, such as is indicated in Fig. 2 of the drawings, will answer the purpose.

In order to enable the scale-beam H, which has the arm I, to be brought to a state of rest when in the lowermost position, in which it shall be perfectly horizontal, I place in the frame A, beneath the arm I, a set-screw, $l^2$, which is shown in Fig. 2, and which can be turned up or down to adjust the position of rest of said scale-beam with the utmost nicety. Said set-screw may be put into the arm I, instead of being in the frame A, with the same result. The vibrations of the weighing-box are made use of for operating a register, which is indicated in Fig. 6, in the manner described in said prior Patent No. 306,759.

I claim—

1. The combination of the oscillating weighing-box L with the sustaining vertically-movable uprights $n$, and with the two pairs of toggle-levers J and M, that are pivoted to said box and also to one of said uprights, substantially as shown and described.

2. The combination of the weighing-box L, pivoted in the uprights $n$, which are capable of vertical motion with the toggle-levers J M, and links N N, having projections $e^2$, as specified.

3. The combination of the pivoted weighing-box L, having partition P, with the roller $t$, uprights $n$, toggle-levers J M, and means for moving said toggle-levers, substantially as described.

4. The combination of the pivoted weighing-box with two separate pairs of toggle-levers with which it is joined, said toggle-levers being arranged to lock said box in each of its two inclined positions automatically, substantially as described.

5. The pivoted weighing-box L, combined with the transverse rail T and laterally-adjustable weight thereon, all at one end of said box, as specified.

6. The combination of the scale-beam H and its slotted arm I with the screw $h^2$, nut $f^2$, having gudgeons $g^2$, and with the weight K, substantially as and for the purpose herein shown and described.

7. The weighing-box L, combined with the uprights $n$, frame $m$, scale-beam H, and with the doubly-pivoted link V and frame A, substantially as described.

MORIS F. KOCH.

Witnesses:
    CHARLES G. M. THOMAS,
    JOHN C. TUNBRIDGE.